(12) United States Patent
Maidel et al.

(10) Patent No.: US 7,681,914 B2
(45) Date of Patent: Mar. 23, 2010

(54) AIRBAG MODULE

(75) Inventors: Jochen Maidel, Ulm (DE); Michael Kraft, Ulm (DE); Mathew Beaumont, Schwendi-Orsenhausen (DE); Oliver Glöckler, Nersingen (DE); Rainer Heuschmid, Ulm (DE); Joachim Nüsseler, Langenau (DE)

(73) Assignee: Takata Petri AG, Aschaffenburg (DE)

( * ) Notice: Subject to any disclaimer, the term of this patent is extended or adjusted under 35 U.S.C. 154(b) by 664 days.

(21) Appl. No.: 11/464,640

(22) Filed: Aug. 15, 2006

(65) Prior Publication Data
US 2007/0040366 A1 Feb. 22, 2007

(30) Foreign Application Priority Data
Aug. 16, 2005 (DE) .................. 10 2005 039 418

(51) Int. Cl.
*B60R 21/233* (2006.01)
*B60R 21/239* (2006.01)
(52) U.S. Cl. ...................... 280/739; 280/729
(58) Field of Classification Search ............. 280/739, 280/729
See application file for complete search history.

(56) References Cited

U.S. PATENT DOCUMENTS 5,725,244 A * 3/1998 Cundill ................... 280/739
6,131,949 A 10/2000 Lewis et al.
6,378,898 B1 4/2002 Lewis et al.
6,832,778 B2 12/2004 Pinsenschaum et al.
2003/0020266 A1 1/2003 Vendely et al.
2003/0214124 A1 11/2003 DePottey et al.
2004/0183282 A1* 9/2004 Schneider et al. ........ 280/730.1

FOREIGN PATENT DOCUMENTS

EP 1 418 093 A1 5/2004
GB 2 306 409 A 5/1997
WO WO 03/104046 A1 12/2003

* cited by examiner

*Primary Examiner*—Ruth Ilan
*Assistant Examiner*—Keith Frisby
(74) *Attorney, Agent, or Firm*—Foley & Lardner LLP

(57) ABSTRACT

The disclosed apparatus can control the cross section of at least one vent opening of an airbag module, through which gases can escape into the environment. The apparatus can include: at least one covering part for at least partially covering the at least one vent opening and an operating mechanism comprising a gas source and an inflatable element in fluid communication with the gas source. The inflatable element can be configured to produce a variation in the outlet cross section of the vent opening in cooperation with the covering part.

35 Claims, 9 Drawing Sheets

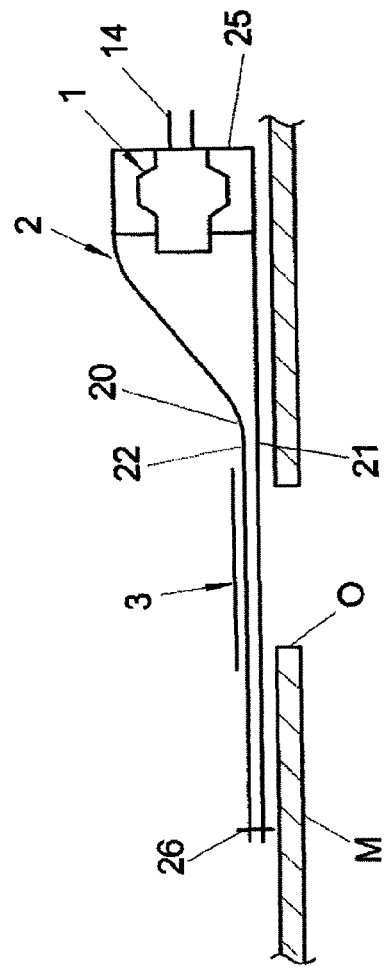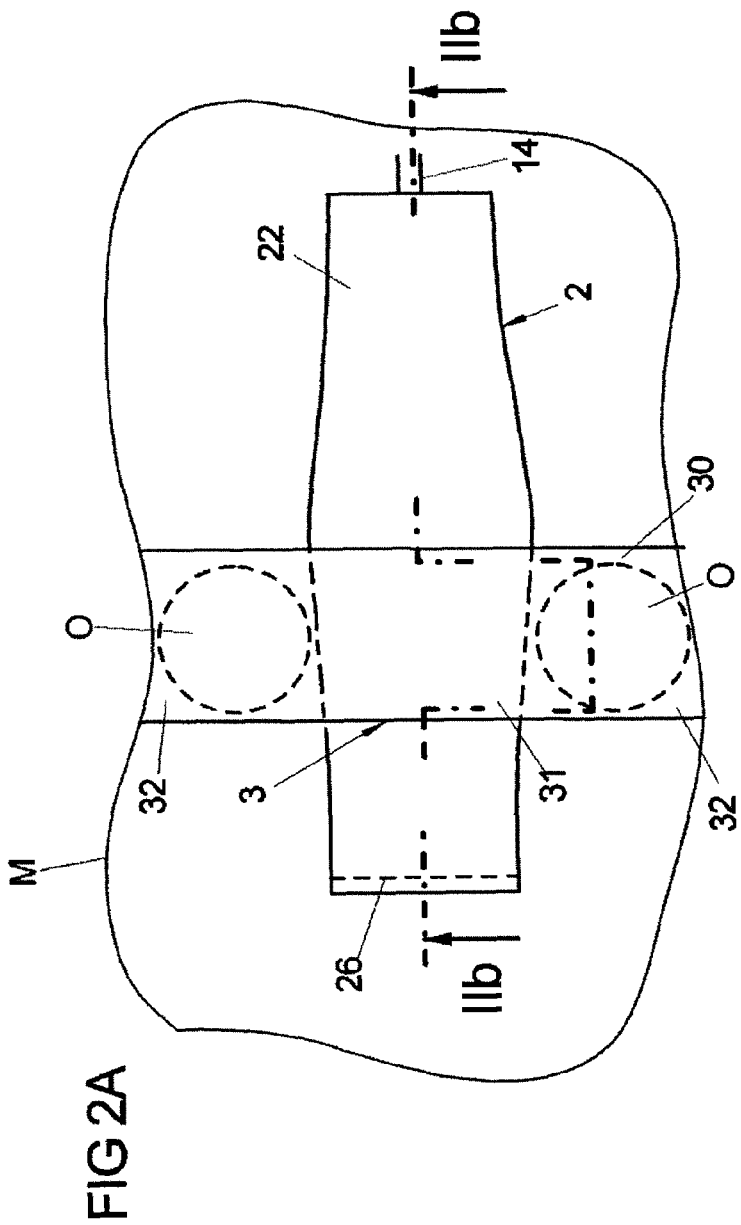

AIRBAG MODULE

BACKGROUND

The application relates to an apparatus for controlling the outlet cross-section of a vent opening for an airbag module.

An airbag module typically includes a gas bag and a gas generator for inflating the gas bag in case of a collision, so that the inflated gas bag forms a gas cushion for protecting an occupant of the vehicle. The gas cushion acts as a restraining device which dampens the impact on an occupant, and especially prevents a direct impact of the occupant against certain injurious parts of the vehicle.

The optimum internal pressure of the gas bag in the inflated state, so as to protect an occupant against injury, is dependent upon a number of parameters, for example the size and weight of the occupant to be protected, the position of the occupant at the moment of a collision, and the nature and gravity of the accident. It is therefore expedient to provide on the airbag module, such as on the gas bag or another component of the airbag module (for example, at a connection between the gas generator and the gas bag), including exhaust or vent openings through which gas can flow out from the airbag module, especially from the inflated or yet-to-be-inflated gas bag. Furthermore, the at least one vent opening, through which gas (produced by the gas generator of the airbag module and originating from the airbag module) can flow away into the environment, can also be arranged outside of the airbag module, especially on a vehicle part containing the airbag module, for example a back-rest of a vehicle chair in the case of a side-airbag module.

The amount of gas released from the gas generator for the inflation of the gas bag is so chosen that it permits the production of the maximum internal pressure in the gas bag, which at certain values of the above-stated parameters proves optimum for the protection of an occupant. In the presence of other values of the above-stated parameters, exhaust or vent openings provided on the airbag module can then serve for reducing the internal pressure in the gas bag, advantageously at certain points in time during and/or after the inflation of the gas bag. For this purpose, it is known to vary the exhaust cross section of a particular vent by varying the position of a covering part with which the vent can be covered, by means of an associated actuating mechanism, such that the vent opening will have a cross section adapted to the values of the above-stated parameters.

The present invention is addressed to the problem of improving an actuating mechanism by which the exhaust cross section of a vent opening will be adjustable, especially in regard to the possibility of a flexible integration of the actuating mechanism into an airbag.

SUMMARY

This problem can be solved according to an embodiment of the present invention by the creation of an apparatus for controlling the cross section of at least one vent opening of an airbag module with an operating mechanism comprising a gas source and an element inflatable by means of the gas source. When the element is inflating, it cooperates with the covering part covering the vent opening such that it produces a variation in the outlet cross section of the vent opening.

Accordingly, a fastening mechanism is provided through which the outlet cross section of the vent opening is controllable. A gas source and an element inflatable by means of the gas source, which in the case of inflation cooperates with a covering element associated with the particular vent opening, brings about a change in the outlet cross section of the vent opening.

The solution according to the present invention can have the advantage that an actuating mechanism, which may comprise an inflatable element and an associated gas source, can be flexibly positioned in an airbag module while the inflatable element can also be folded with the gas bag serving for the protection of the vehicle's occupants. Such an actuating mechanism using a small number of components permits a defined control of the outlet cross section of a vent opening, and thus permits a defined control of the internal pressure of the gas bag.

The gas source filling the inflatable element with gas can advantageously form a component which is separate from the at least one gas generator which serves to inflate the gas bag protecting the occupants. In particular, the gas source can be controlled separately (and independently) from the gas generator so that the time that the gas source is started for inflating the inflatable element is not established by the instant at which the gas generator is started for the inflation of the gas bag protecting the vehicle's occupant. Thus, the gas source can be ignited at moments in time which are not predetermined by the ignition of the gas generator. The gas source can therefore be activated, e.g., ignited, to fill the inflatable element with gas simultaneously with the gas generator or at a specific moment after the gas generator. Due to the possibility of igniting the gas source at any time before, during or after the activation of the gas generator provided for the inflation of the gas bag, the internal pressure of the gas bag can be optimally controlled and adapted to a particular accident situation and to the size and position of the occupants to be protected so that optimum adaptability is provided.

Moreover, the gas source associated with the inflatable element can be preferably separated spatially from the gas generator serving to inflate the gas bag. Thus, a flexible arrangement of the actuating mechanism comprising the gas source and the inflatable element is made possible.

The gas source associated with the inflatable element may be preferably designed for the pyrotechnical generation of gas. The inflatable element has clearly less bulk, compared with the inflatable gas bag in the gas-filled state, because it serves only for the control of at least one vent opening of the airbag module. Thus, the amount of gas necessary for the filling of the inflatable element can be generated simply by an igniter, for example, one in the form of an ignition battery which usually serves to ignite the pyrotechnical charge of a gas generator of an airbag module without the need for an additional pyrotechnical charge.

The gas source may be preferably disposed in the space surrounded by the covering of the inflatable element. However, the gas source can also be basically disposed outside of the inflatable element and be connected with the inflatable element by a gas-conducting connector.

The inflatable element, which has an envelope of a flexible material (for example a fabric), is an element separate from the gas bag to be inflated. That is, the envelope of the inflatable element is not a component of the envelope of the gas bag but it can be connected therewith, in order to, for example, cover the vent opening provided on each gas bag. The gas bag in the inflated state envelops a definite first volume while the inflatable element in the gas-filled state envelops a second volume different from the first volume and may preferably lie outside the first volume. Alternatively, the second volume can lie within the first volume.

Upon the filling with gas, the influence of the inflatable element on the associated covering part to change the outlet cross section of at least one vent opening takes place by utilizing the change of volume of the inflatable element upon the filling with gas, especially the accompanying change in the spatial position of the envelope of the inflatable element as well as a stiffening of that envelope.

According to a preferred embodiment of the present invention, the inflatable element can be a tube-like shape so that its size in at least one direction, for example the longitudinal direction, of the tube increases when filling with gas.

According to an embodiment of the present invention, the covering part provided for covering over at least one vent opening can be a component of the inflatable element, especially an integral component of the envelope of the inflatable element. In another embodiment of the present invention, the covering part can be a part separate from the envelope of the inflatable element. That is, the covering part is a part which— in contrast to the envelope —does not serve to define the interior of the inflatable element but which can be joined to the envelope of the inflatable element.

The apparatus according to one embodiment of the present invention can, on the one hand, be arranged and configured such that the covering part closes first partially or completely the at least one associated vent opening, i.e., before the inflatable element fills with gas, and such that, when the inflatable element is filled with gas, such an effect is made on the covering part that the outlet cross section of the vent opening is enlarged, i.e., the covering part releases the vent opening. On the other hand, the vent opening can be provided such that it is uncovered at least partially at first, i.e., before the inflatable element fills with gas, and is covered increasingly by the filling of the inflatable element with gas so that the outlet cross section also diminishes.

According to another embodiment of the present invention, before the inflatable element is filled with gas, the covering part is releasably fastened in a position in which it covers partially or completely one vent opening. This connection is releasable, preferably destroyable, by forces which are produced upon the filling of the inflatable element with gas and the accompanying enlargement of the volume of the releasable element. The connection serving to fix the covering part in a certain position can especially be in the form of a tear-open joint, for example in the form of a tear seam.

The vent opening to be covered can be provided in the envelope of the inflatable gas bag, and the covering part can be joined to the envelope such that it covers the vent opening. The connection between the gas bag and the covering part (which can be formed by a portion of the envelope of the inflatable element) can simultaneously join two areas of the envelope of the inflatable element. The two areas can move apart from one another when the inflatable element fills with gas so that the connection is released, preferably destroyed.

According to another embodiment of the present invention, the inflatable element can reach through a vent opening such that the vent opening is not completely closed before the inflatable element fills with gas, i.e., the escape of gas through the vent opening is possible. The inflatable element can be configured and arranged in regard to the vent opening such that it completely closes the vent opening in the gas-filled condition. In the case of a vent opening of circular shape, for example, the inflatable element is so configured that it has a substantially circular cross section in the gas-filled state, for example the inflatable element can have a hollow cylindrical shape.

The envelope of the inflatable element can be configured, on the one hand, such that no gas can escape from the inflatable element. In this case, after the inflatable element is filled with gas, the associated vent opening is permanently closed. On the other hand, the envelope of the inflatable element can have a defined permeability to gas, for example in that that envelope has a vent opening so that the inflatable element, after filling with gas, reduces its volume again and thereby again releases the associated vent opening, at least partially.

According to another embodiment of the present invention, the covering part can be formed by a flexible portion which lies on the inflatable element (and in this case can be connected with it sectionally) and simultaneously covers, at least partially, a vent opening. By filling the inflatable element with gas and accompanied by the change in the volume of the inflatable element, the covering part is lifted; thus releasing the associated vent opening.

According to one embodiment of the present invention, an airbag module for controlling the cross section of at least one vent opening of the airbag module can be characterized by having a gas bag, a gas generator, a vent opening, and an apparatus for controlling the cross section of the vent opening.

It is to be understood that both the foregoing general description and the following detailed description are exemplary and explanatory only, and are not restrictive of the invention as claimed.

BRIEF DESCRIPTION OF THE DRAWINGS

Further details and advantages of the invention will be made clear in the following description of its embodiments, with the aid of the drawings.

FIGS. 2a and 2b show a top plan view and a cross section of a second embodiment of the present invention in which the vent opening is covered by an associated covering part.

FIG. 4a shows the system before the inflatable element is filled with gas. FIG. 4b shows the system after the inflatable element is filled with gas.

FIG. 5a shows the system before the inflatable element is filled with gas. FIG. 5b shows the system after the inflatable element is filled with gas.

DETAILED DESCRIPTION

Figure 6:
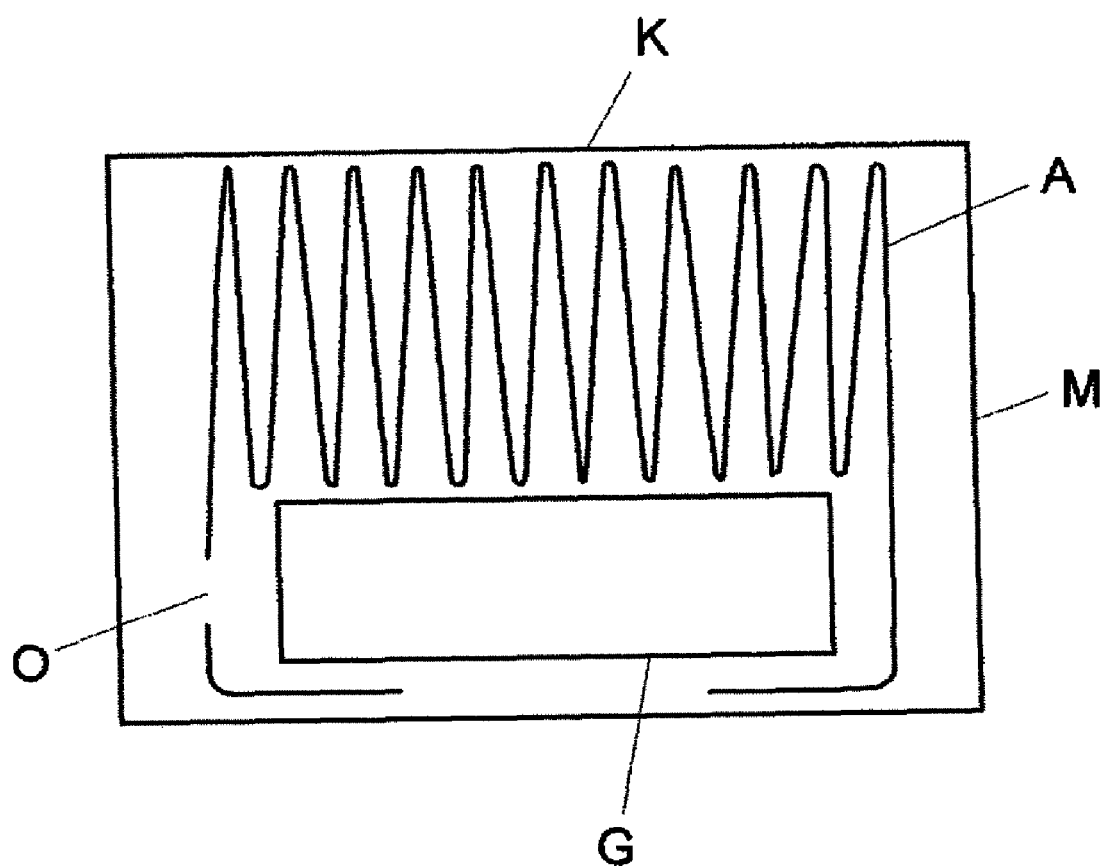
FIG. 6 shows a schematic representation of an airbag module for a motor vehicle according to an embodiment of the present invention.

In FIG. 6, an airbag module for a motor vehicle is represented schematically in which the airbag module comprises an inflatable gas bag A and a gas generator G for filling the gas bag A. The gas bag A and the gas generator G are disposed in a modular housing M whose upper covering surface is closed by a cap K.

In the case of a collision, the airbag module is activated by the ignition of the gas generator G which then releases gas to inflate the gas bag A. When the gas bag A is inflated it unfolds and an opening is released in the cover K of the airbag module M by the pressure of the unfolding gas bag A, and through the opening, the gas bag A can unfold to protect a vehicle occupant.

On the airbag module, more precisely on the gas bag A, in order to reduce the internal pressure in the gas bag A, a vent opening O is provided through which gas can escape from the interior of gas bag A into the environment. The vent opening O is controllable in regard to the size of its outlet cross section. Because the vent opening O is controllable, both the moment at which gas can issue from the interior of the gas bag A into the environment and the amount of the escaping gas can be controlled. Thus, the internal pressure of the gas bag A can be controlled, according to the values of certain parameters which determine the optimum internal pressure of the gas bag A to protect a vehicle's occupant. These parameters can include, for example, the size, the weight and the position of the occupant who is to be protected within the vehicle as well as the nature and severity of the accident that leads to the ignition of the gas generator G.

Various embodiments of the present invention will now be explained with reference to FIGS. 1 to 5b, in which an apparatus with a vent opening O of the kind shown in FIG. 6 can be affected with regard to its outlet cross section by releasing or closing the vent opening O at a certain moment in time.

Figure 1:
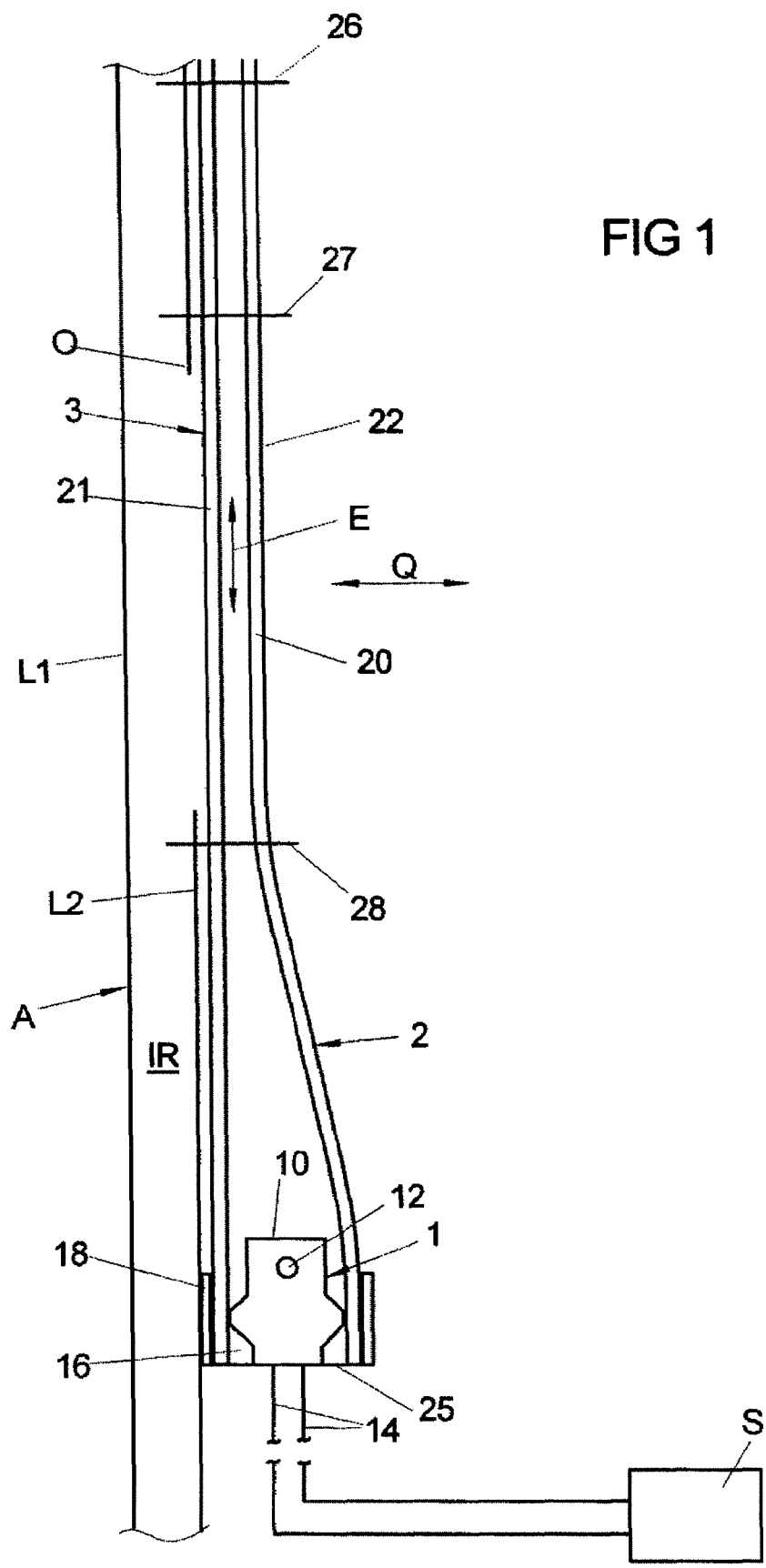
FIG. 1 shows a first embodiment of a vent opening of an airbag module, which is covered by a covering part, in which the covering part is removable by means of an actuating mechanism for the release of the vent opening.
Figure 3B:
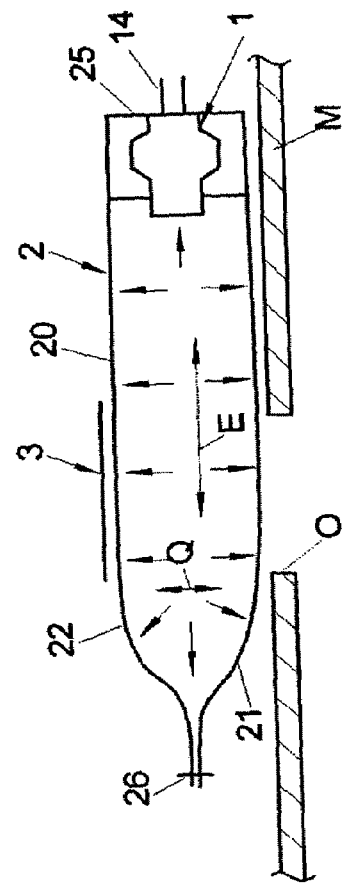
FIGS. 3a and 3b shows a top plan view and a cross section of the embodiment of FIGS. 2a and 2b after the removal of the covering part from the vent opening.
Figure 3A:
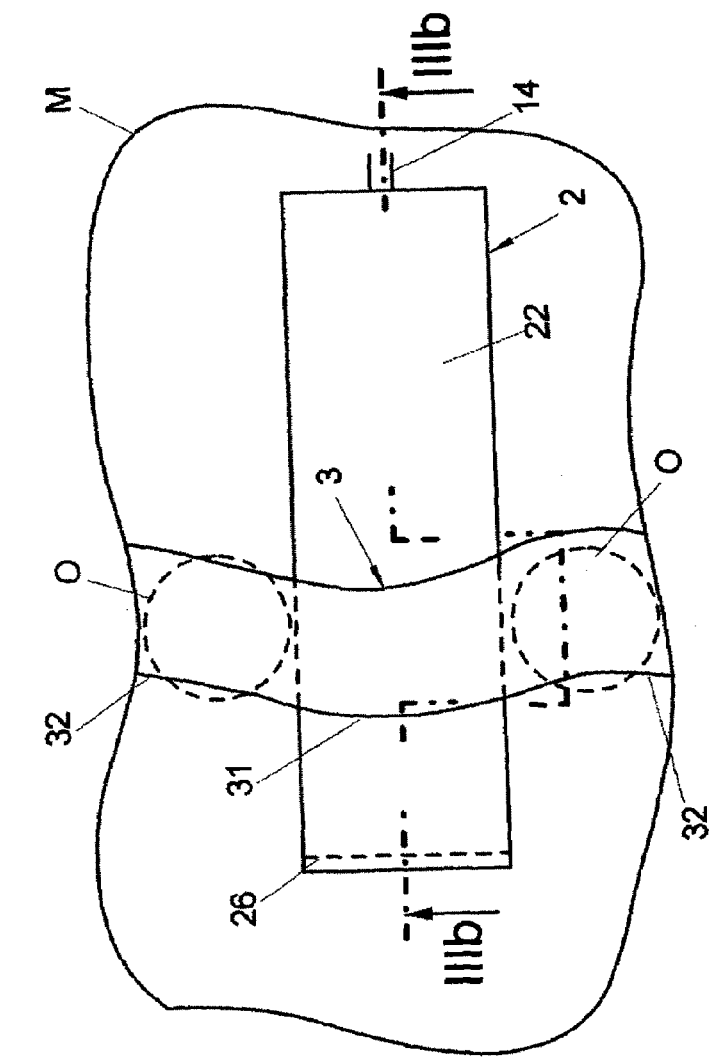

In the embodiment represented in FIG. 1, two layers L1 and L2 lying opposite one another are shown which can involve an upper part and a lower part (or a front part and a rear part) of the gas bag A. The two layers L1 and L2, as components of the envelope of the gas bag A, can define the interior IR of the gas bag A, which can be inflated by the delivery of gas. In the case of two envelope portions, the layers L1 and L2, for example, can be two separate gas bag parts, especially in the form of fabric layers which are suitably joined together, e.g., by sewing and/or cementing. Alternatively, the two envelope parts L1 and L2 can also form two portions of a one-piece gas bag envelope which can consist, for example, of a single three-dimensional fabric layer.

The envelope of gas bag A, formed by the two gas bag layers L1 and L2 (or in other cases, other gas bag parts not shown in FIG. 1), has a vent opening O (such as, in one of the gas bag layers L1 and L2) through which gas can escape from the interior IR of the gas bag A into the environment, whenever the gas bag shown in the uninflated state in FIG. 1 is inflated by a gas generator G, as explained in FIG. 6.

In the uninflated state of gas bag A shown in FIG. 1, the vent opening O is at first covered by the covering part 3 which forms a component of the envelope 20 of an inflatable element 2 in the form of a filling tube. The envelope 20 of the filling tube 2 extends along a longitudinal direction E and can comprise two flexible envelope parts 21 and 22 which—as seen along the longitudinal direction E—accommodate a gas source 1 at one end 25 and at the opposite end 26 are joined together by a gas-tight seam. The envelope parts 21 and 22 can be, for example, formed as fabric pieces. The gas source 1 provided at the one end 25 may include a receiver 10 for a pyrotechnical charge and an igniter 12 in the form of an ignition battery for igniting the pyrotechnical charge on the basis of electrical impulses which can be fed to the igniter 12 in a known manner by means of connecting lines 14.

Provided that the inflatable element 2 is made sufficiently compact with a correspondingly small bulk in the gas-filled state, then according to a preferable embodiment, the additional pyrotechnical charge can be avoided and the ignition of the igniter 12 in the form of an ignition battery can release gas that can be exclusively used for filling the inflatable element 2. In other words, the gas released by the igniter 12 completely fills the inflatable element 2 with gas and is used in the gas generator G for the inflation of the gas bag A by igniting an additional pyrotechnical charge in the gas generator G for producing the necessary gas for the inflation of the gas bag.

The gas source 1, especially its ignition mechanism, is connected by the connecting lines 14 to an electrical control apparatus S in which the values of certain given parameters, which are determined, e.g., by sensors, are brought together and evaluated. These determined parameters are important for the establishment of an optimum internal pressure in the gas bag A when the gas bag is inflated in a collision, particularly for the setting of an optimum internal pressure in the interior IR of the gas bag A at certain points in time.

The housing-like container 10 of the gas generator 1 is established at the one end 25 of the filling tube 2 between the two envelope parts 21 and 22 by means of a clamping ring 18 and a clip 16 disposed within the filling tube 2 such that the two envelope portions 21 and 22 are joined in a gas-tight fashion at the end 25.

Thus, the two envelope parts 21 and 22 of the envelope 20 together with the gas source 1 arranged at one end of the filling tube 2 and the seam provided at the other end of the filling tube 2 surround an interior space of the inflatable element in the form of a filling tube in a gas-tight manner.

The filling tube 2 covers with its envelope 20, more precisely with its one envelope part 21, the vent opening O of the gas bag A. The envelope is joined to the envelope of the gas bag A along the periphery of the vent opening O by releasable junctions 27 and 28 in the form of at least one tear seam. Particularly, the envelope 20 is joined to the envelope of the gas bag A at the one gas bag layer L2. The releasable junctions 27 and 28 extend in the form of tear seams along the circumference of the vent opening O and they simultaneously join together the two ends of the opposing envelope parts 21 and 22 of the filler tube 2.

If, in the event of a collision, the gas bag A is filled with gas by an associated gas generator G to protect an occupant of the vehicle, as represented for example in FIG. 6, this gas at first cannot pass out again from the interior IR of the gas bag through the vent opening O and therefore remains in the gas bag A (unless the gas bag A has other gas-permeable areas).

If, however, it is determined by a controller S associated with the gas source 1 that, to establish optimum protection of an occupant of the vehicle under the actual conditions and it is expedient to open the vent opening O in the envelope of the gas bag A, the igniter 12 of the gas source associated with the filler tube 2 is ignited by the controller S via the electrical connecting lines 14. Thus, by the combustion of a pyrotechnical charge provided in the receiver 10 of the gas source 1, a gas is produced which flows into the interior of the filler tube 2 so that the filler tube unfolds transversely along its length E. In this case, the two envelope parts 21 and 22 lying opposite one another tend to separate from one another along a direction Q perpendicular to the longitudinal direction of the tube. The releasable joining parts 27 and 28 (in the form of tear seams 27 and 28) become greatly stressed so that they pull apart while the junction between the envelope parts 21 and 22 of the filler tube 2 and the envelope of the gas bag A (or more precisely the one layer L2 of the envelope of the gas bag A) is released. Thus, there is no longer a strong junction between the envelope 20 of the filler tube 2 and the envelope L1 and L2 of the gas bag A so that the vent opening O in the envelope L1 and L2 of the gas bag A is no longer closed by the envelope 20 of the filler tube 2. Gas can then issue from the interior of the gas bag A through the vent opening O into the environment in order to reduce the internal pressure in gas bag A, and thus put the internal pressure at an optimum value for the protection of the occupants under the given conditions.

It is to be noted that in FIG. 1 only a small section of the gas bag A and its envelope L1, L2 is shown while the filler tube 2 forming an associated inflatable element serving to close the vent opening O is shown substantially in full. Accordingly, the envelope surface of the gas bag A is substantially larger than the envelope surface of the filler tube 2. The gas bag A can comprise a substantially larger volume with its envelope L1, L2 in the inflated state than the inflatable element 2 in the form of a filler tube with its envelope 20.

In the embodiment represented in FIG. 1, the inflatable element 2 is arranged outside of the gas bag A so that, in the inflated state of the filler tube 2, the volume enclosed within it is outside of the volume enclosed by the gas bag A.

Furthermore, it is to be noted that the inflatable element 2 does initially close the air outlet opening O of the gas bag A, and is fixedly bound section-wise to the envelope L1-L2 of the gas bag A. However, the inflatable element 2 expressly forms no lasting component of the envelope L1-L2 of the gas bag A because the filler tube 2, when the gas bag A is inflated to protect a vehicle's occupant and at least if certain conditions are satisfied, is designed to separated from the envelope L1-L2 of the gas bag A by means of an associated controller S and gas source 1 in order to free the vent opening O.

An embodiment of the present invention is shown in FIGS. 2a and 2b, wherein a first difference is the fact that the vent opening O which is to be closed by means of a covering element 3 is not provided in the gas bag but in a bottom part of a module housing M of the airbag module. Also, in this embodiment, there is not just a single vent opening O which is to be closed by a covering part 3 but two vent openings O are covered and closed simultaneously by means of a covering part 3. The vent openings O in the module housing M can also serve for exhausting gas (produced by a gas generator) before any gas has passed into the gas bag A.

An additional difference between the embodiment of FIGS. 2a and 2b and the embodiment of FIG. 1 is the covering part 3 provided for closing the inflatable element 2. According to FIGS. 2a and 2b, the covering part 3 does not serve to define and surround the interior space of the filler tube 2 which can be filled with gas. Instead, the covering part 3 is a flexible piece—for example in the form of a fabric layer 30—separate from the filler tube 2.

In this case, the covering part 3 can comprise a middle section 31 that lies flat on the envelope 20 of the inflatable element 2 and two lateral sections 32 standing apart from the middle section 31 of the covering part 3. The vent openings O are arranged on either side of the filler tube 2 while the filler tube is in the uninflated state (i.e., the initial situation) in which the vent openings O are closed by the covering part.

The middle section 31 of the covering part can be joined in an appropriate manner to the envelope 20 of the inflatable element 2, for example, by cementing or sewing. In a like manner, the free ends of the lateral sections 32 of the covering part can be releasably fixed to the modular housing M. Thus, the covering part 3 can be held specifically in the position shown in FIGS. 2a and 2b in which the covering part covers the associated vent openings O and closes them to such an extent that little or no amounts of gas can pass through these vent openings O.

In the case of a collision, if the controller S (shown in FIG. 1) determines that gas is to flow through the vent openings O in order to optimize the pressure conditions within the gas bag G (shown in FIG. 6), the gas source 1 is ignited through the electrical connecting lines 14 by means of the controller S. As a result, gas is released from the gas source 1 and the inflatable element 2 is filled with the gas so that the inflatable element changes to the state shown in FIGS. 3a and 3b. In this case, the volume enveloped by the envelope 20 of the filler tube 2 increases while the two envelope parts 21 and 22 of the envelope 20 of the filler tube 2 separate from one another along a direction Q across the longitudinal direction E of the filler tube 2. In this manner, the covering part 3 lying on the envelope, particularly on the portion 22 of the envelope 20, is lifted away from the vent openings O so that gas can issue from the vent opening.

Figure 4A:
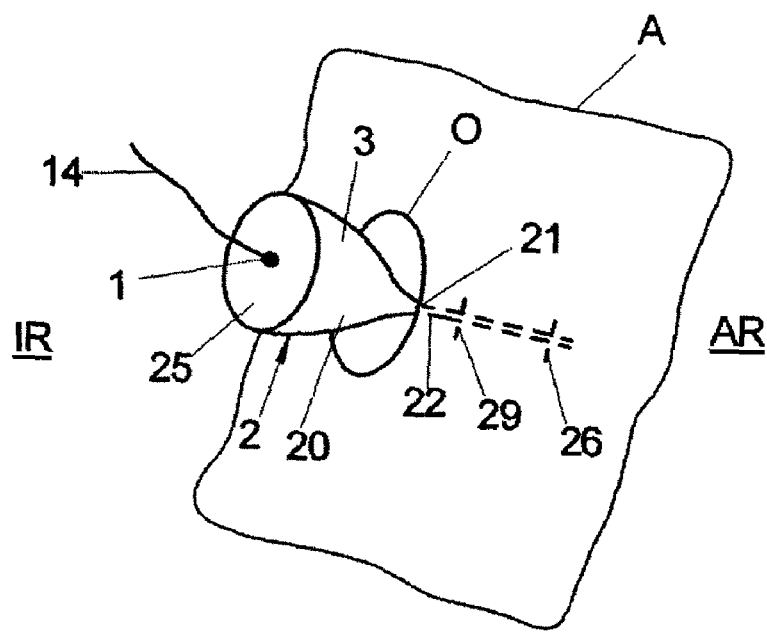
FIGS. 4a and 4b show an embodiment of the present invention in which an inflatable element can be used for closing the vent opening.

FIG. 4a shows an embodiment of an apparatus for controlling the cross section of a vent opening O in which the vent opening O is provided in the envelope of a gas bag A which can be inflated to protect a vehicle occupant. The covering part 3 that is provided for closing the vent opening O is integrated into the envelope 20 of the inflatable element 2. The inflatable element 2 is in the form of a filler tube.

An important difference from the embodiment of FIG. 4a with the previous embodiments is that, in FIG. 4a, the associated vent opening O is opened so that gas can issue through it out of the interior space IR of the gas bag A into the exterior space A when the inflatable element 2 is in the slack case, i.e., not the gas-filled state.

For this purpose, the inflatable element 2 is arranged such that it reaches through the vent opening O in the envelope of the gas bag A without closing it. A releasable connection 29 is provided in the form of a rip seam between two envelope portions 21 and 22 of the envelope 20, and joins these two portions 21 and 22 together such that the filler tube is essentially flat in the non-gas-filled state and thus does not interfere with the flow of gas through the vent opening O.

In the case of a collision, if the controller coupled through an electrical connecting line 14 find that it is advantageous to close the vent opening O for the production of an optimum internal pressure in the interior IR of the gas bag A, the gas source 1 is ignited in the manner described in connection with FIG. 1. Gas is thereby released which fills the inflatable element 2 so that the inflatable element expands in a radial direction R, i.e., perpendicular to the longitudinal direction E, whereupon the rip seam 29 opens, as seen in FIG. 4b.

The filler tube 2 extends in its longitudinal direction E substantially perpendicular to the vent opening O through which the inflatable element 2 reaches. The filler tube applies its circumferential surface (formed by the envelope parts 21 and 22) against the periphery of the vent opening O so that the vent opening is closed.

When the two end faces 25 and 26 of the inflatable element 2 are closed in a gas-tight manner as described in FIG. 1, the vent opening O is likewise closed up.

Figure 4B:
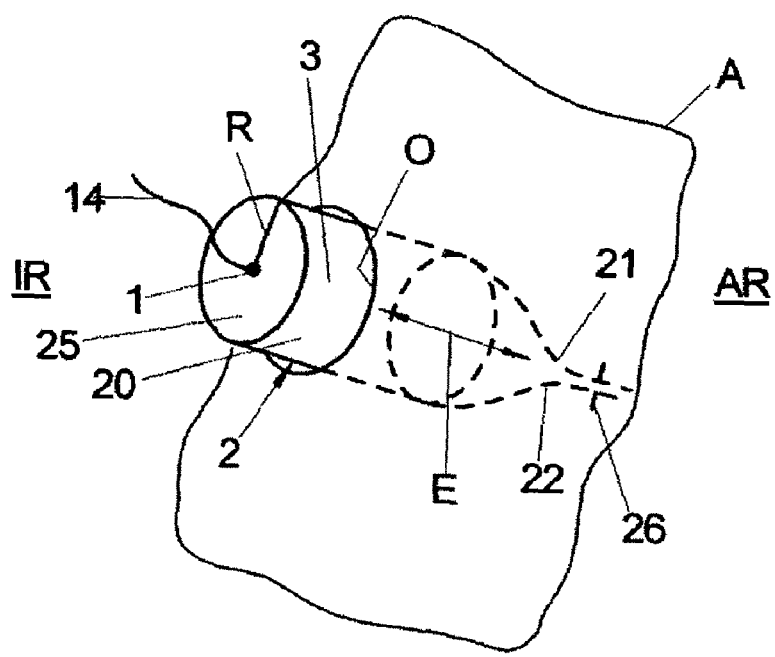
Figure 5A:
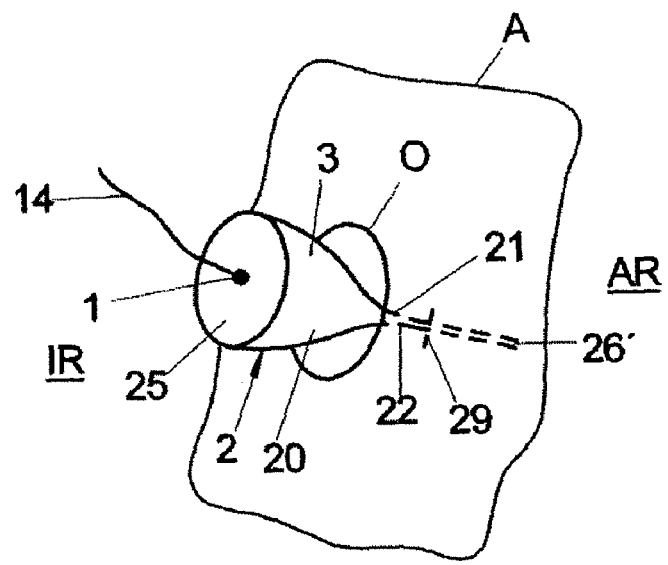
FIGS. 5a and 5b show another embodiment of the present invention.
Figure 5B:
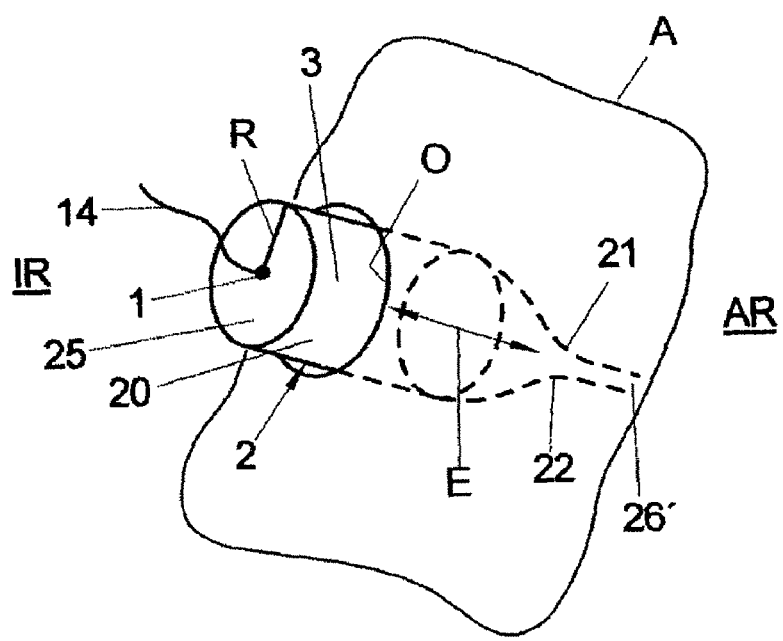

FIGS. 5a and 5b shows another embodiment in which the difference from the embodiment of FIGS. 4a and 4b is the fact that the one end 26' (behind the rip seam 29) of the inflatable element 2 is not closed with a long-lasting seam (such as the seam 26 in FIGS. 4a and 4b).

Therefore, after the inflatable element 2 in the form of a filler tube is filled with gas and after the bursting of the rip seam 29, the gas in the inflatable element 2 can escape again through the one end 26' so that the closing of the vent opening O by the inflatable element 2 is only momentary. The vent opening is reopened again by the escape of gas from the inflatable element and by the deflation of the inflatable element 2.

Figure 7A:
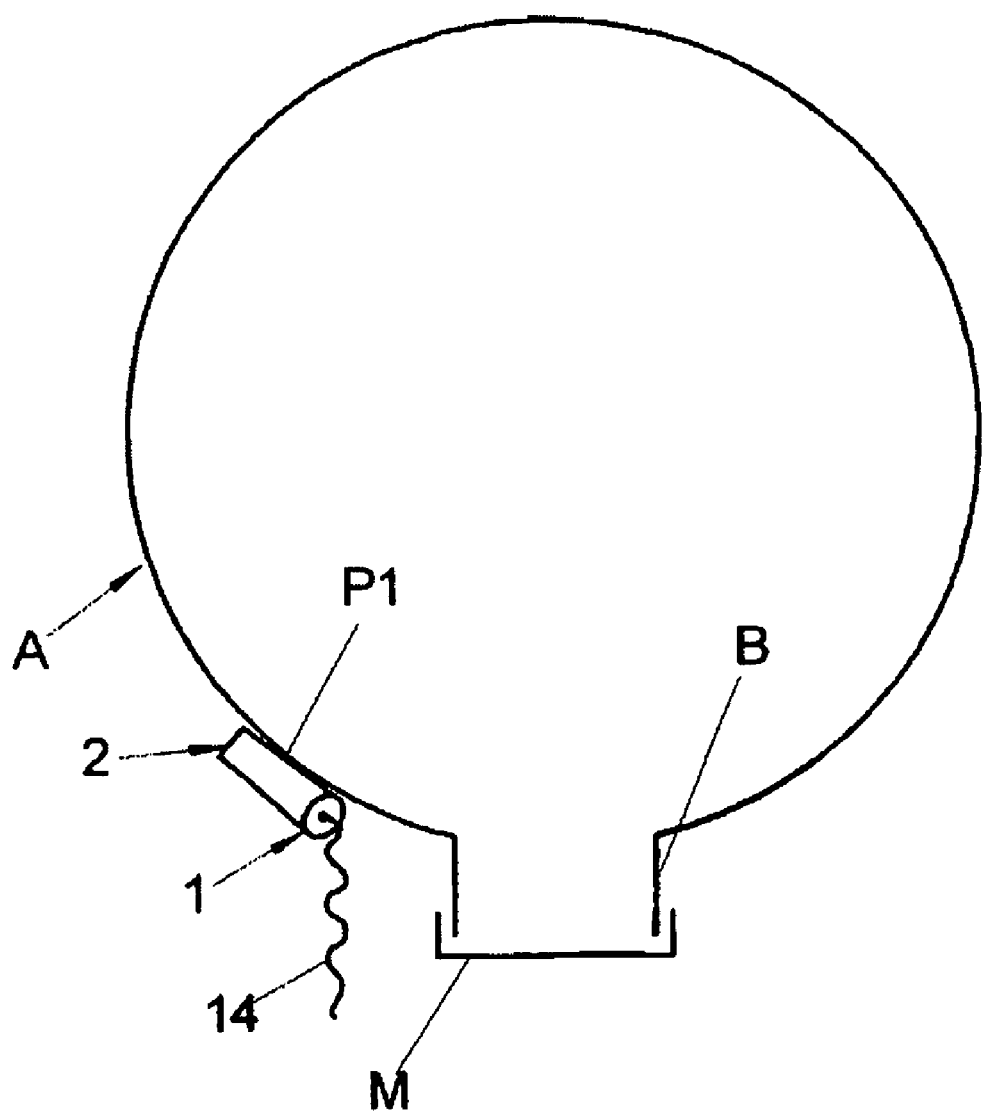
FIGS. 7A, 7B, and 7C show various possibilities for arranging the covering part and the associated operating mechanism on a gas bag.
Figure 7B:
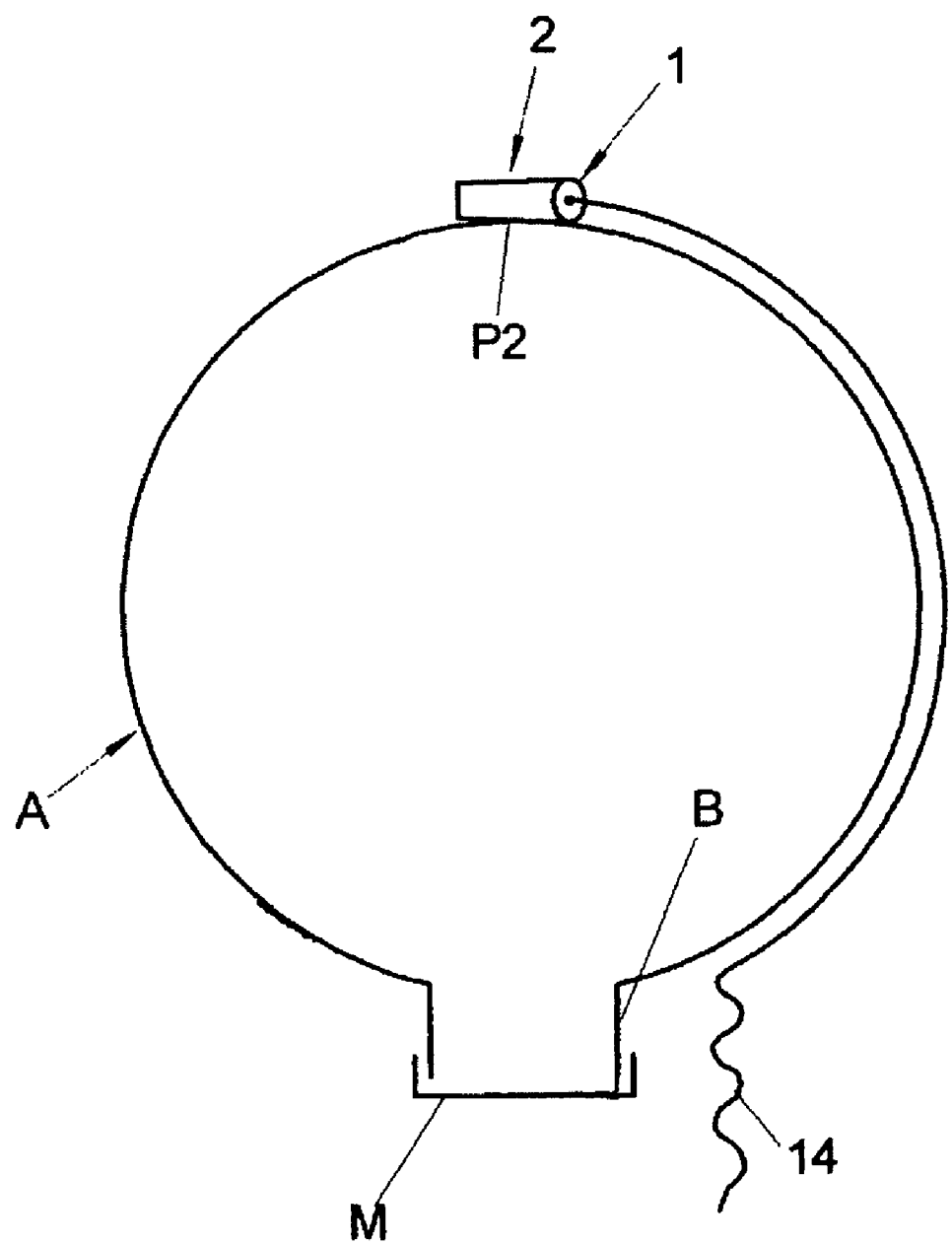
Figure 7C:
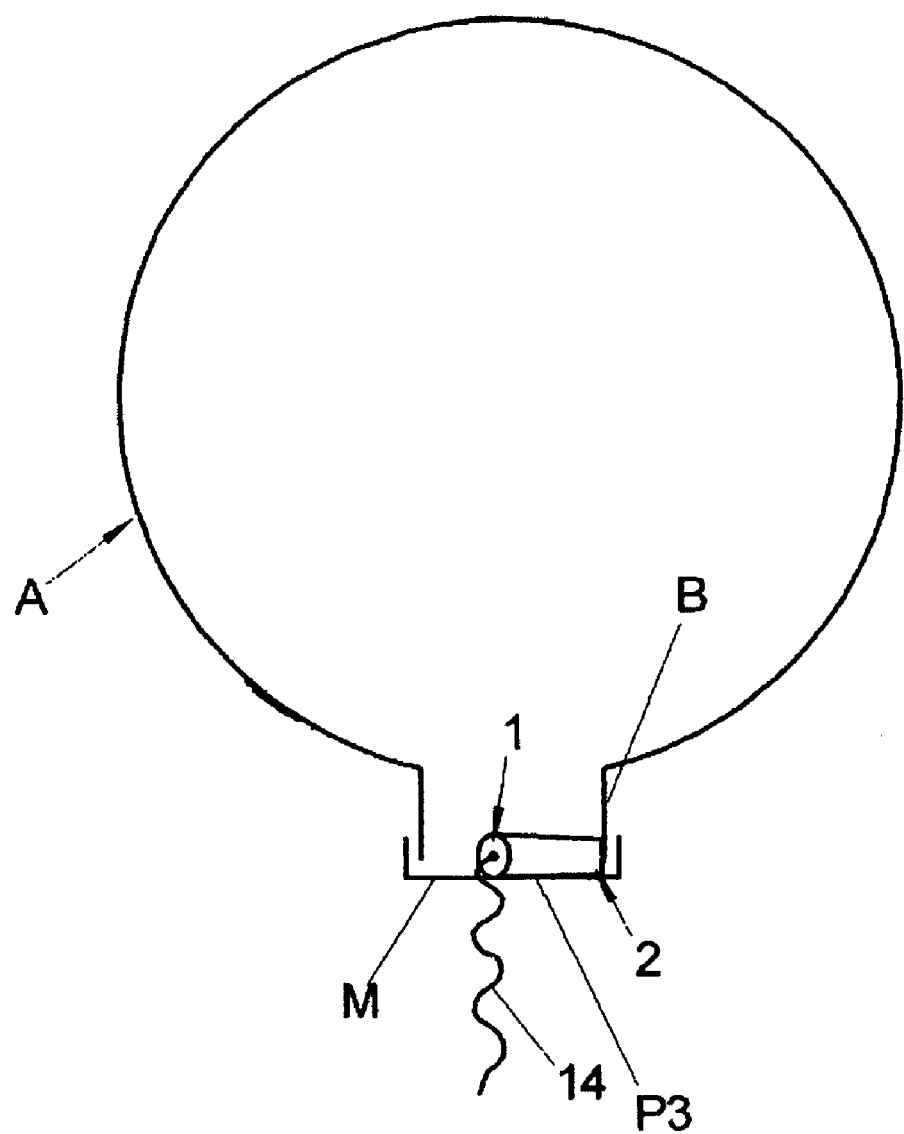

In FIGS. 7A, 7B, and 7C, various possible arrangements of the vent opening are represented. One example is on the airbag module, namely a first position P1 (shown in FIG. 7A) on the gas bag A in which, when the gas bag A is in the inflated state, the first position is slightly outside of and in the vicinity of the module housing M, which serves to accommodate the gas bag A as well as the associated gas generator G (as seen in FIG. 6). Another example is a second position P2 (shown in FIG. 7B) on the gas bag A, which is at the maximum distance from the module housing M in the inflated state of the gas bag. A third position P3 (shown in FIG. 7C) shows a possible arrangement of the vent opening on the module housing M beneath the inflation mouth B of the gas bag, through which gases coming from a gas generator can enter the gas bag A. At each of the three positions P1, P2, P3 of a vent opening on the gas bag, a suitable position of the associated inflatable element 2 (which here simultaneously forms the covering part for the vent opening), their corresponding gas source 1, and their corresponding electrical connecting line 14 are shown by way of example.

In the case of the arrangement of the gas source 1 and the inflatable element 2 to cover a vent opening at the position P3 on the module housing, the gas source 1 may be preferably arranged in the vicinity of the gas generator that serves for inflating the gas bag A and is to be contained in the module housing M.

In the case of a vent opening provided at the gas bag A or on its envelope itself, the vent opening can be preferably situated at a position P2 near the module housing M—with respect to the inflated state of the gas bag A—so that gases issuing from the vent opening do not flow against the vehicle's occupant who is to be protected by the gas bag A.

The gas source 1 of the inflatable element 2 can be arranged as closely as possible at the position P1, P2 or P3 of the vent opening so as to permit control of the discharge cross section of the vent opening by an inflatable element 2 of the smallest possible size. An inflatable element 2 which can be filled with a small amount of gas offers the advantage that the associated gas source 1 can be made correspondingly small and light.

In the embodiments described above, the vent opening O, which can be closed at least partially by means of the covering part and thus on the airbag module itself with regard to its outlet cross section, is configured in each case on the airbag module itself, namely on a component of the airbag module, such as the gas bag A or the module housing M. Alternatively, the vent opening O, which can be at least partially closed and thus variable in its outlet cross section, can also be provided on a part of the motor vehicle outside of the airbag module, e.g., on a seat back in the case of a side airbag module, and can be in fluid connection with the airbag module through a gas-conducting connection.

The priority application, German Patent Application No. 10 2005 039 418.3, filed on Aug. 16, 2005, including the specification, drawings, claims, and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An apparatus for controlling an outlet cross section of at least one vent opening of an airbag module, through which gas can escape from the airbag module, comprising:
    at least one covering part for at least partially covering the at least one vent opening; and
    an operating mechanism comprising a gas source and an inflatable element in fluid communication with the gas source,
    wherein the inflatable element is configured to produce a variation in the outlet cross section of the vent opening in cooperation with the covering part,
    wherein the covering part is formed by at least one flexible piece and forms a component of the inflatable element, and
    wherein the covering part is releasably fastened in a position in which the covering part at least partially covers the vent opening and is configured to lift off from the vent opening when the inflatable element fills with gas.

2. The apparatus according to claim 1, further comprising a gas bag and a gas generator for inflating the gas bag, wherein the gas source for filling the inflatable element with gas forms a component that is different from the gas generator.

3. The apparatus according to claim 2, further comprising a controller configured to separately control the gas source and the gas generator.

4. The apparatus according to claim 2, wherein the gas source is spatially separate from the gas generator.

5. The apparatus according to claim 1, wherein the gas source is designed for pyrotechnical production of gases for filling the inflatable element.

6. The apparatus according to claim 1, further comprising an igniter for igniting the gas source, whereby gas needed for completely filling the inflatable element is produced.

7. The apparatus according to claim 1, wherein the gas source is disposed within the inflatable element.

8. The apparatus according to claim 1, further comprising a gas bag, wherein the gas bag envelops a first defined volume in an inflated state, and wherein the inflatable element envelopes a second defined volume in the inflated state.

9. The apparatus according to claim 8, wherein the second volume lies outside of the first volume.

10. The apparatus according to claim 8, wherein the second volume lies within the first volume.

11. The apparatus according to claim 8, wherein the first volume is greater than the second volume.

12. The apparatus according claim 1, wherein the outlet cross section of the vent opening is configured to vary by an increase of a volume enveloped by the inflatable element when the inflatable element is filled with gas.

13. The apparatus according to claim 1, wherein the position of the covering part is influenced by an increase of a volume enveloped by the inflatable element such that the outlet cross section of the vent opening varies.

14. The apparatus according to claim 1, wherein the inflatable element in a gas-filled state forms a flexible tube extending lengthwise in a longitudinal direction.

15. The apparatus according to claim 14, wherein an extent of the inflatable element along at least one direction perpendicular to the longitudinal direction of the inflatable element is configured to increase when the inflatable element fills with gas.

16. The apparatus according to claim 1, wherein the airbag module comprises a gas bag, and wherein the vent opening is formed on the gas bag.

17. The apparatus according to claim 16, wherein the covering part is fastened to the gas bag.

18. The apparatus according to claim 16, wherein the inflatable element comprises an envelope, wherein the covering part is fastened to the gas bag by a fastening, wherein two areas of the envelope of the inflatable element are simultaneously joined together, and wherein the two areas of the envelope are configured to move away from one another when the inflatable element fills with gas and thus release the fastening.

19. The apparatus according to claim 1, wherein in the airbag module comprises a gas bag, and wherein the vent opening is formed on a component of the airbag module different from the gas bag.

20. The apparatus according to claim 1, wherein the covering part is releasably fastened in a position in which the covering part completely covers the vent opening.

21. The apparatus according to claim 1, wherein fastening of the covering part is releasable by forces produced during filling of the inflatable element with gas.

22. The apparatus according to claim 1, wherein fastening is releasable by tearing an opening in a fastening mechanism.

23. The apparatus according to claim 1, wherein at least one seam is used to produce fastening to releasably fasten the covering part in the position.

24. The apparatus according to claim 1, wherein the inflatable element comprises an envelope formed by at least one flexible envelope part.

25. The apparatus according to claim 1, wherein the inflatable element comprises an envelope that is configured to be closed in a substantially gas-tight condition in an inflated state.

26. The apparatus according to claim 1, wherein the inflatable element comprises an envelope that has a defined permeability for gas in an inflated state.

27. The apparatus according to claim 1, wherein the variation in the outlet cross section of the vent opening when the inflatable element is filled with gas corresponds to an enlargement of the outlet cross section of the vent opening.

28. An airbag module for motor vehicles comprising:
   a gas bag for protecting a vehicle occupant;
   a gas generator for inflating the gas bag;
   a vent opening through which gas originating from the airbag module can escape; and
   an apparatus for controlling an outlet cross section of the vent opening comprising:
      at least one covering part for at least partially covering the at least one vent opening; and
      an operating mechanism comprising a gas source and an inflatable element in fluid communication with the gas source,
   wherein the inflatable element is configured to produce a variation in the outlet cross section of the vent opening in cooperation with the covering part,
   wherein the covering part is formed by at least one flexible piece and forms a component of the inflatable element, and
   wherein the covering part is releasably fastened in a position in which the covering part at least partially covers the vent opening and is configured to lift off from the vent opening when the inflatable element fills with gas.

29. The airbag module according to claim 28, wherein the vent opening is provided on the airbag module.

30. The airbag module according to claim 28, further comprising a module housing to accommodate the gas bag and the gas generator.

31. An apparatus for controlling an outlet cross section of at least one vent opening of an airbag module, through which gas can escape from the airbag module, comprising:
   an operating mechanism comprising a gas source and an inflatable element in fluid communication with the gas source,
   wherein the inflatable element includes at least one covering part for at least partially covering the at least one vent opening,
   wherein the inflatable element is configured to produce a variation in the outlet cross section of the vent opening with the covering part,
   wherein the covering part is formed by at least one flexible piece, and
   wherein the covering part is releasably fastened in a position in which the covering part at least partially covers the vent opening and is configured to lift off from the vent opening when the inflatable element fills with gas.

32. The apparatus according to claim 31, further comprising a gas bag and a gas generator for inflating the gas bag, wherein the gas source for filling the inflatable element with gas forms a component that is different from the gas generator.

33. The apparatus according to claim 32, further comprising a controller configured to separately control the gas source and the gas generator.

34. The apparatus according to claim 32, wherein the gas source is spatially separate from the gas generator.

35. The apparatus according to claim 32, wherein the covering part is fastened to the gas bag.

* * * * *